(12) United States Patent
Kim et al.

(10) Patent No.: US 12,508,906 B2
(45) Date of Patent: Dec. 30, 2025

(54) METHOD AND DEVICE FOR PROCESSING VIDEO OBTAINED BY CIRCUIT DRIVING OF VEHICLE

(71) Applicants: Hyundai Motor Company, Seoul (KR); Kia Corporation, Seoul (KR)

(72) Inventors: Min Han Kim, Gyeonggi-do (KR); Won Min Kim, Seoul (KR); Sung Gyu Kim, Gyeonggi-do (KR); Joong Young Sung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 10 days.

(21) Appl. No.: 18/609,547

(22) Filed: Mar. 19, 2024

(65) Prior Publication Data

US 2025/0091438 A1  Mar. 20, 2025

(30) Foreign Application Priority Data

Sep. 18, 2023 (KR) .......................... 10-2023-0124130

(51) Int. Cl.
*H04N 5/232* (2006.01)
*B60K 35/21* (2024.01)
*H04N 5/262* (2006.01)

(52) U.S. Cl.
CPC .......... *B60K 35/21* (2024.01); *H04N 5/2628* (2013.01); *B60K 2360/31* (2024.01); *B60K 2360/589* (2024.01)

(58) Field of Classification Search
CPC ............... B60K 35/21; B60K 2360/31; B60K 2360/589; H04N 5/2628; H04N 21/21805; H04N 5/77; H04N 7/181; H04N 13/282; B60R 1/27; G01C 21/3804
See application file for complete search history.

(56) References Cited

U.S. PATENT DOCUMENTS

| 10,607,485 B2* | 3/2020 | Gupta ..................... H04N 7/183 |
| 2013/0033602 A1* | 2/2013 | Quast ....................... B60R 1/27 |
| | | 348/148 |
| 2018/0255274 A1* | 9/2018 | Arase .................. H04N 5/2628 |
| 2018/0297525 A1* | 10/2018 | Raybuck, III ......... H04N 23/90 |
| 2020/0090307 A1* | 3/2020 | Friebe .................... H04N 7/181 |
| 2021/0105420 A1* | 4/2021 | Lu ............................ B60R 1/27 |
| 2023/0159043 A1* | 5/2023 | Kim ...................... B60W 40/08 |
| | | 701/41 |

(Continued)

FOREIGN PATENT DOCUMENTS

| KR | 10-2023-0075778 A | 5/2023 |
| KR | 10-2023-0084809 A | 6/2023 |

*Primary Examiner* — Howard D Brown, Jr.
(74) *Attorney, Agent, or Firm* — Fox Rothschild LLP (57) ABSTRACT

A method for processing video obtained by circuit driving includes receiving a plurality of videos taken by shooting an outside of a vehicle, receiving input by a user for moving a viewpoint of a first surround view video, creating a second surround view video having the viewpoint moved from the first surround view video based on the plurality of videos and the input by the user, and providing the second surround view video, where the first surround view video and the second surround view video display both the outside of the vehicle and a virtual model of the vehicle through processing of the plurality of videos.

18 Claims, 7 Drawing Sheets

(56) References Cited

U.S. PATENT DOCUMENTS

| | | | |
|---|---|---|---|
| 2023/0173919 A1* | 6/2023 | Kim | B60K 35/81 |
| | | | 701/36 |
| 2023/0316455 A1* | 10/2023 | Wang | H04N 23/698 |
| 2023/0319218 A1* | 10/2023 | Ren | G06T 3/4038 |
| | | | 382/284 |
| 2024/0343193 A1* | 10/2024 | Choi | B60R 1/22 |
| 2025/0091438 A1* | 3/2025 | Kim | B60K 35/21 |

* cited by examiner

METHOD AND DEVICE FOR PROCESSING VIDEO OBTAINED BY CIRCUIT DRIVING OF VEHICLE

CROSS REFERENCE TO RELATED APPLICATION

The present application claims under 35 U.S.C. § 119(a) the benefit of Korean Patent Applications No. 10-2023-0124130, filed Sep. 18, 2023, the entire contents of which are incorporated by reference herein.

BACKGROUND

(a) Technical Field

The present disclosure relates to a method and device for processing video obtained by circuit driving of a vehicle, more particularly, to the system and method configured to process a plurality of videos of the vehicle obtained from circuit driving and convert the videos to a video incorporating a surround view.

(b) Description of the Related Art

Existing video shooting methods of vehicles running on a circuit are usually performed in the vehicles. A separate camera may be mounted for shooting outside a vehicle, and in this case, there is a possibility of the camera falling and only a specific viewpoint can be provided.

Conventionally, video recorded by a front camera has been available by overlaying log data on the video as a shooting method of vehicles running on a circuit in the related art, but this method has limitation that the method uses only a front camera video and has to record on a specific SD card and play the video.

Meanwhile, cameras for a surround view video are generally positioned on the front/rear/left/right, etc. of a vehicle and shoot the entire region of the Field of View of each video through a wide-angle lens, whereby it is possible to record a 360° view outside a vehicle.

Such a video is played under environments such as Audio Video Navigation (AVN) (integrated electric part) or a specific Application Programming Interface (API), and it can also be provided as a 360° bird's eye view.

However, cameras for a surround view video in the related art are designed to automatically stop shooting for the purpose of safety when a speed exceeds a predetermined level, so vehicles running on a circuit or common roads cannot use a surround view video and a surround view video is partially used only in parking or stopping.

SUMMARY

A system and method are configured to provide a surround view video of a vehicle that is changed by adjusting the viewpoint of a vehicle in or after driving.

Further, system and method can provide a circuit map created using a surround view video of a vehicle or can provide a tracking line that is a path along which a vehicle drove on a circuit.

A method for a circuit driving video service according to an embodiment includes: receiving, by a processor, a plurality of videos taken by shooting the outside of a vehicle; receiving, by the processor, input by a user for moving a viewpoint of a first surround view video; creating, by the processor, a second surround view video having the viewpoint moved from the first surround view video based on the plurality of videos and the input by the user; and providing, by the processor, the second surround view video, wherein the first surround view video and the second surround view video display both the outside of the vehicle and a virtual model of the vehicle through processing of the plurality of videos.

The method may further include: receiving, by the processor, one or more of a driving state of the vehicle or position information of the vehicle; and providing, by the processor, the first surround view video or the second surround view video in accordance with any one or more of the driving state of the vehicle or the position information of the vehicle.

The providing of the first surround view video or the second surround view video may include providing the first surround view video or the second surround view video when any one or more conditions in which the driving state of the vehicle is a stop state or the position of the vehicle is on a circuit that is a racing road are satisfied.

The method may further include: creating, by the processor, a circuit map of the circuit on which the vehicle drove and a tracking line along which the vehicle drove on the circuit using the plurality of videos; creating, by the processor, a first circuit driving map showing the circuit and a driving path of the vehicle using the circuit map and the tracking line; and providing, by the processor, the first circuit driving map.

The method may further include: receiving, by the processor, position information of the vehicle and circuit data related to the position of the vehicle; creating, by the processor, a tracking line along which the vehicle drove in a circuit map included in the circuit data using the position information of the vehicle and the circuit data; creating, by the processor, a second circuit driving map showing the circuit and a driving path of the vehicle using the circuit map and the tracking line; and providing, by the processor, the second circuit driving map.

The method may further include: receiving, by the processor, an optimal driving line in the circuit map; creating, by the processor, a third circuit driving map showing the tracking line and the optimal driving line in the circuit map; and providing, by the processor, the third circuit driving map.

The method may further include: receiving, by the processor, position information of another vehicle, which is positioned on the same circuit as the vehicle, and circuit data related to the position of the vehicle; creating, by the processor, a fourth circuit driving map showing the position of the another vehicle in a circuit map included in the circuit data using the position information of the another vehicle and the circuit data; and providing, by the processor, the fourth circuit driving map.

The plurality of videos, the first surround view video, and the second surround view video may be any one of real-time videos or recorded videos.

The method may further include transmitting, by the processor, any one or more of the first surround view video or the second surround view video in a real-time streaming manner.

The first surround view video and the second surround view video may be provided as a Virtual Reality (VR) video.

A device for processing video obtained by circuit driving according to an embodiment includes: a memory configured to store instructions for providing a circuit driving video service; and a processor configured to execute the instructions, wherein the instructions are configured to, when executed by the processor, cause the device to: receive a plurality of videos taken by shooting the outside of a vehicle; receive input by a user for moving a viewpoint of a first surround view video; create a second surround view video having the viewpoint moved from the first surround view video based on the plurality of videos and the input by the user; and provide the second surround view video, wherein the first surround view video and the second surround view video display both the outside of the vehicle and a virtual model of the vehicle through processing of the plurality of videos.

The processor may receive one or more of a driving state of the vehicle or position information of the vehicle, and provide the first surround view video or the second surround view video in accordance with any one or more of the driving state of the vehicle or the position information of the vehicle.

The processor may provide the first surround view video or the second surround view video when any one or more conditions in which a driving state of the vehicle is a stop state or the position of the vehicle is on a circuit that is a racing road are satisfied.

The processor may create a circuit map of the circuit on which the vehicle drove and a tracking line along which the vehicle drove on the circuit using the plurality of videos, create a first circuit driving map showing the circuit and a driving path of the vehicle using the circuit map and the tracking line, and provide the first circuit driving map.

The processor may receive position information of the vehicle and circuit data related to the position of the vehicle, create a tracking line along which the vehicle drove in a circuit map included in the circuit data using the position information of the vehicle and the circuit data, create a second circuit driving map showing the circuit and a driving path of the vehicle using the circuit map and the tracking line, and provide the second circuit driving map.

The processor may receive an optimal driving line in the circuit map, create a fourth circuit driving map showing the tracking line and the optimal driving line in the circuit map, and provide the fourth circuit driving map.

The processor may receive position information of another vehicle, which is positioned on the same circuit as the vehicle, and circuit data related to the position of the vehicle, create a third circuit driving map showing the position of the another vehicle in a circuit map included in the circuit data using the position information of the another vehicle and the circuit data, and provide the third circuit driving map.

The plurality of videos, the first surround view video, and the second surround view video may be any one of real-time videos or recorded videos.

The processor may transmit any one or more of the first surround view video or the second surround view video in a real-time streaming manner.

The first surround view video and the second surround view video may be provided as a Virtual Reality (VR) video.

The present disclosure provides a surround view video that is changed by a user adjusting a viewpoint during or after driving, thereby being able to provide a user with more interesting and dynamic vehicle video and driving video. Accordingly, it is possible to increase satisfaction of users in driving of a vehicle and induce interests of a user and other users in a vehicle and driving of a vehicle.

Further, the present disclosure can enable a user to easily know matters to make up for when driving on a circuit and can contribute to improving the circuit driving record of a user by providing a circuit map and/or a tracking line that is a path along which a vehicle drove on the circuit using a surround view video.

Further, the present disclosure can arouse interests of a user and other users in a vehicle and driving of a vehicle by providing the user and the other users with a tracking line of a circuit, a driving record time, vehicle information, etc.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", "portion" and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMS, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereafter, embodiments of the present disclosure will be described in detail with reference to the accompanying drawings and the same or similar components are given the same reference numerals regardless of the numbers of figures and are not repeatedly described. In the following description, if it is decided that the detailed description of known technologies related to the present disclosure makes the subject matter of the embodiments described herein unclear, the detailed description is omitted. Further, the accompanying drawings are provided only for easy understanding of embodiments disclosed in the specification, the technical spirit disclosed in the specification is not limited by the accompanying drawings, and all changes, equivalents, and replacements should be understood as being included in the spirit and scope of the present disclosure.

Terms including ordinal numbers such as "first" and "second" may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element with the other element therebetween. On the other hand, it should be understood that when one element is referred to as being "connected directly to" or "coupled directly to" another element, it may be connected to or coupled to another element without the other element therebetween.

Singular forms are intended to include plural forms unless the context clearly indicates otherwise.

Figure 1:
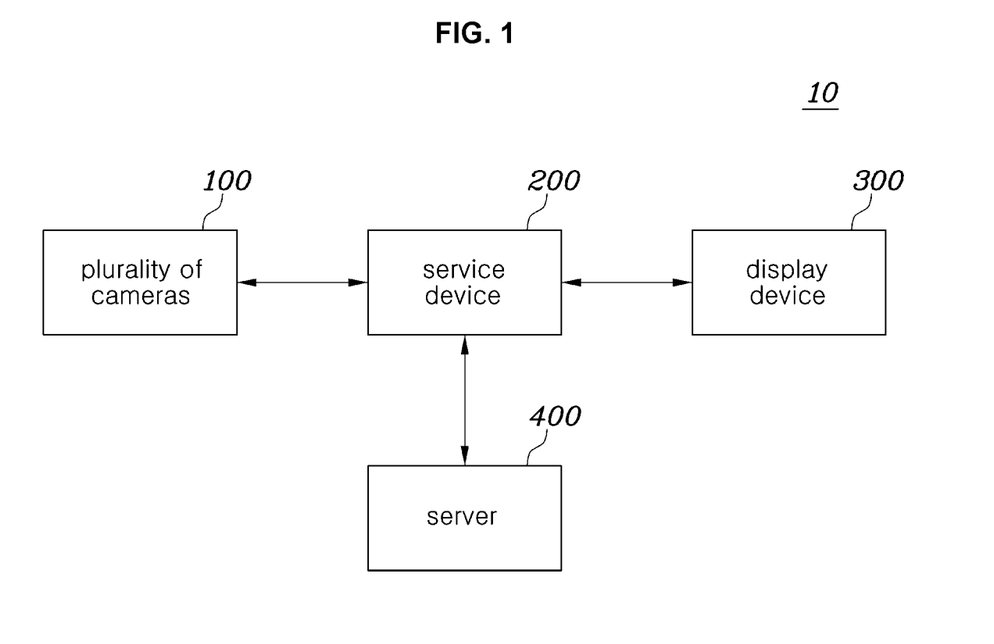
FIG. 1 is a view showing a circuit driving video service system according to an embodiment.

FIG. 1 is a view showing a circuit driving video service system according to an embodiment.

A circuit driving video service system 10 includes a plurality of cameras 100, a service device 200, a display device 300, and a server 400.

The circuit driving video service system 100 can provide a surround view video of a vehicle that is changed by adjustment of a viewpoint by a user.

The circuit driving video service system 10 can provide a circuit map created using a surround view video of a vehicle and/or a tracking line that is a driving path of a vehicle in a circuit.

The cameras 100 are installed in a vehicle and can shoot the outside of the vehicle, and can transmit a plurality of shot images.

For example, the cameras 100 may be configured such that a Field of View (FOV) region of each camera includes a common circuit width (e.g., a left-right width of about 8 m and a front-rear width of about 3.5 m) in shooting and may be configured such that even though a vehicle is driven close to one line (apex line) on a circuit, the opposite line is also included in an FOV region.

The service device 200 provides a surround view video that is changed by a user adjusting a viewpoint during or after driving, thereby being able to provide a user with more interesting and dynamic vehicle video and driving video. Accordingly, it is possible to increase satisfaction of users in driving of a vehicle and induce interests of a user and other users in a vehicle and driving of a vehicle.

The service device 200 can enable a user to easily know matters to make up for when driving on a circuit and can contribute to improving the circuit driving record of a user by providing a circuit map and/or a tracking line that is a path along which a vehicle drove on the circuit using a surround view video.

The service device 200 can arouse interests of a user and other users in a vehicle and driving of a vehicle by providing the user and the other users with a tracking line of a circuit, a driving record time, vehicle information, etc.

The service device 200 can receive a plurality of videos transmitted from the cameras 100.

The service device 200 can create a surround view video displaying both the outside of a vehicle and a virtual model of the vehicle by processing a plurality of videos.

For example, a surround view may include a bird eye view that is a viewpoint looking down the outside of a vehicle from above a virtual model of the vehicle.

The service device 200 can receive input by a user or input by another user from the display device 300 and/or the server 400.

The service device 200 can create a surround view video with a viewpoint moved after input by a user from a surround view video before input by the user based on a plurality of videos and the input by the user.

The service device 200 can store a surround view video and/or a plurality of videos.

The service device 200 can transmit a surround view video and/or a plurality of videos to the display device 300 and/or the server 400.

For example, when the service device 200 transmits a surround view video and/or a plurality of videos, the service device 200 can transmit them in a wired/wireless type through another high-performance communication device (not shown).

For example, the service device 200 can process and store videos, which are actually displayed on the display device 300 of a surround view video and a plurality of videos, as one video.

The service device 200 can create a circuit driving map including any one or more of a path along which a vehicle drove on a circuit, the positions of other vehicles on the circuit, and/or an optimal driving line in a circuit map of the circuit on which the vehicle drove, using any one or more of a plurality of videos, a surround view video, position information of the vehicle, position information of other vehicles, and/or the optimal driving line of the circuit.

The service device 200 can transmit and/or store the circuit driving map.

The display device 300 can display any one or more of a surround view video and/or a plurality of videos.

The display device 300 can sense input by a user for moving the viewpoint of any one or more of a surround view video and/or a plurality of videos.

For example, the display device 300 can sense input by a user for moving a viewpoint in a drag direction accompanying touch input by the user or can remotely sense a finger gesture and/or finger movement of a user for moving a viewpoint.

The display device 300 can transmit the sensed input by the user to the service device 200.

For example, the display device 300 may be In-Vehicle Infotainment (IVI) equipment, and for example, may be implemented as an Audio Video Navigation (AVN) device, a cluster, an integrated display, or the like.

The server 400 can receive and store a plurality of videos and/or a surround view video and can transmit the stored plurality of videos and/or surround view video in a streaming manner through the internet.

The server can provide a surround view video by processing a plurality of videos and can provide other users with surround view videos having a viewpoint moved by receiving and processing input for moving the viewpoints of the other users.

For example, when another user watches a surround view video that is provided by the server 400 and gives input for moving a viewpoint while watching the surround view video, the server 400 can provide another user with a surround view video having a viewpoint moved in a streaming manner.

Figure 2:
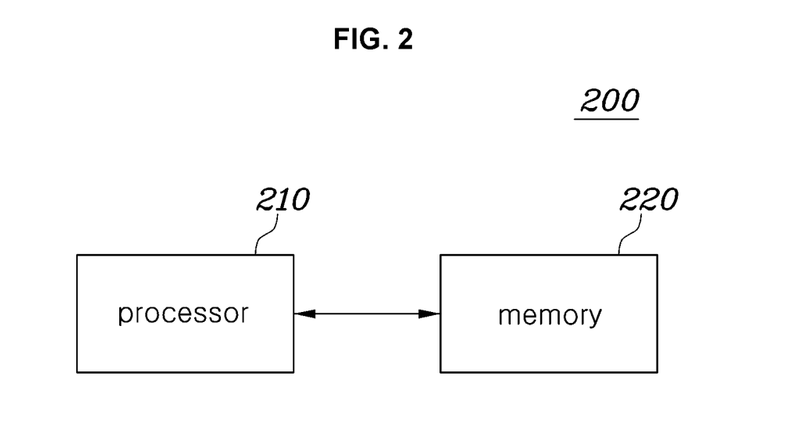
FIG. 2 is a view schematically showing the service device shown in FIG. 1.

FIG. 2 is a view schematically showing the service device shown in FIG. 1.

The service device 200 includes a processor 210 and a memory 220.

The service device 200 is connected to a network through the processor 210 and can communicate with the server 400, etc.

The processor 210 is connected to the network through wireless communication or wired communication and can communicate with the server 400, etc.

The processor 210 may include one or more of a central processing unit, an application processor, or a communication processor.

The processor 210 can perform operation or data processing about control of at least one other component of the service device 200. For example, the processor 210 can execute applications and/or software stored in the memory 220.

The processor 210 can process received data and the data stored in the memory 220. The processor 210 can process the data stored in the memory 220. The processor 210 can execute computer-readable codes (e.g., software) stored in the memory 220 and instructions caused by the processor 210.

The processor 210 may be a data processing device implemented as hardware having a circuit having a physical structure for performing desired operations. For example, the desired programs may include codes or instructions included in a program.

For example, a data processing device implemented as hardware may include a microprocessor, a central processing unit, a processor core, a multi-core processor, a multiprocessor, an Application-Specific Integrated Circuit (ASIC), and a Field Programmable Gate Array (FPGA).

The processor 210 can receive a plurality of videos capturing the outside of a vehicle.

For example, a plurality of videos may be taken with a wide angle, and when a plurality of videos is integrated, it may be a video including all of 360° images of the outside of a vehicle.

The processor 210 can create a first surround view video by processing a plurality of videos.

The processor 210 can receive input by a user for moving the viewpoint of the first surround view video.

The processor 210 can create a second surround view video having a viewpoint moved from the first surround view video based on a plurality of videos and input by a user.

For example, the first surround view video and the second surround view video may be videos in which the outside of a vehicle and a virtual model of the vehicle are both displayed through processing of a plurality of videos.

For example, the processor 210 can output a video the same as or similarly to the actual figure by applying a correction filter to a plurality of videos taken in a distortional state differently from the actual figure due to influence by camera lenses.

For example, a plurality of videos, a first surround view video, and a second surround view video may be any one of real-time videos or recorded videos.

For example, the first surround view video and the second surround view video may be provided as a Virtual Reality (VR) video.

The processor 210 can provide a first surround view video and/or a second surround view video.

The processor 210 can receive any one or more of the driving state and/or the position information of a vehicle.

For example, the position information of a vehicle may be GPS information or the position in a vehicle navigation.

The processor 210 can receive circuit positioning information from a circuit positioning device (not shown).

For example, the circuit positioning device (not shown) can determine the position of a vehicle on a circuit and transmit the position together with circuit positioning information.

The processor 210 can provide a first surround view video or a second surround view video in accordance with any one or more of the driving state and/or the position information of a vehicle.

For example, when any one or more conditions in which the driving state of a vehicle is a stop state (e.g., the vehicle is in P gear) or the position of a vehicle is on a circuit that is a racing road are satisfied, the processor 210 can provide and/or store a first surround view video or a second surround view video.

For example, when the driving state of a vehicle is a stop state, the processor 210 can provide a first surround view video or a second surround view video.

For example, when the driving state of a vehicle is an in-driving state, the processor 210 can provide a first surround view video or a second surround view video only in the case in which the position of the vehicle is on a circuit.

The processor 210 can create a circuit map of a circuit on which a vehicle drove and a tracking line along which the vehicle drove on the circuit using a plurality of videos.

For example, the processor 210 can create a circuit map and a tracking line by extracting and integrating the width of the road of a circuit, the gradient of the road, the shape of the road, the degree of bending of the road, the relative position of a vehicle on the road, etc. that continuously appear in a plurality of videos.

The processor 210 can create a first circuit driving map showing a circuit and a driving path of the vehicle using the circuit map and the tracking line.

The processor 210 can provide the first circuit driving map.

The processor 210 can receive position information of the vehicle and circuit data related to the position of the vehicle.

The processor 210 can create a tracking line along which the vehicle drove in the circuit map included in the circuit data using the position information of the vehicle and the circuit data.

For example, the processor 210 can create driving points continuously existing on a circuit using the position information of a vehicle and can create a tracking line by connecting the driving points in a line and mapping the driving points in a circuit map.

For example, the processor 210 can create driving points of a vehicle continuously existing on a circuit by comparing the position information of the vehicle and circuit positioning information and can create a tracking line by connecting the driving points in a line and mapping the driving points in a circuit map.

The processor 210 can create a second circuit driving map showing a circuit and a driving path of a vehicle using the circuit map and the tracking line.

The processor 210 can provide the second circuit driving map.

The processor 210 can receive an optimal driving line in the circuit map.

For example, the optimal driving line may be a driving path of a vehicle that enables the vehicle to achieve the shortest driving record when driving in the circuit map, and may include an optimal speed that depends on circuit sections, the state of the vehicle, etc.

The processor 210 can create a third circuit driving map showing a tracking line and an optimal driving line in a circuit map.

The processor 210 can provide the third circuit driving map.

The processor 210 can receive, from a user, a vehicle position sharing confirmation message for sharing the position of a vehicle with other users.

The processor 210 can register the vehicle of the user as a shared vehicle in response to the vehicle position sharing confirmation message.

The processor 210 can transmit the position information of the vehicle registered as a shared vehicle.

The processor 210 can receive position information of another vehicle positioned on the same circuit as the vehicle of the user, and circuit data related to the positions of the vehicle.

For example, the position information of another vehicle may be GPS information or the position in the navigation in the another vehicle.

The processor 210 can create a fourth circuit driving map showing the position of the another vehicle in the circuit map included in the circuit data using the position information of the another vehicle and the circuit data.

For example, the processor 210 may stop creating the fourth circuit driving map when the vehicle or the another vehicle goes out of the circuit using the position information of the vehicle or the position information of the another vehicle.

The processor 210 can provide the fourth circuit driving map.

The processor 210 can transmit any one or more of the first surround view video and/or the second surround view video in a real-time streaming manner.

The processor 210 can receive the vehicle information of the user and the other users, tracking lines, driving records, the state of the circuit in the driving day, and can create weekly ranking information, monthly ranking information, and/or total ranking information in order of the driving records.

The processor 210 can provide the weekly ranking information, monthly ranking information, and/or total ranking information.

The memory 220 may include a volatile and/or nonvolatile memory. The memory 220 can store instructions and/or data related to at least one other component of the service device 200.

The memory 220 can store software and/or programs. For example, the memory 220 can store applications, software, etc. for providing the circuit driving video service.

Figure 3:
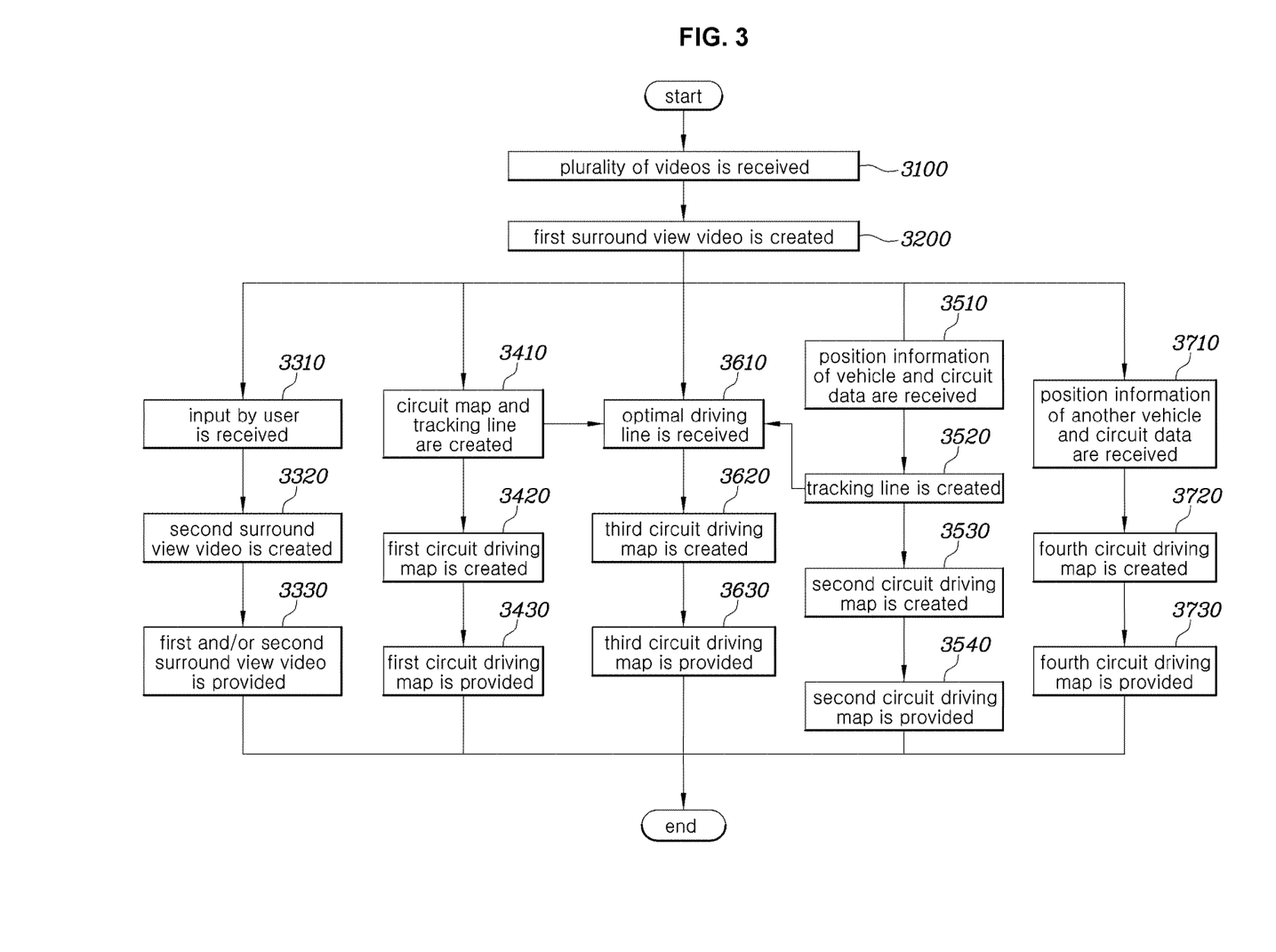
FIG. 3 is a view illustrating the operation of the service device.

FIG. 3 is a view illustrating the operation of the service device.

The service device 200 can receive a plurality of videos capturing the outside of a vehicle (3100).

The service device 200 can create a first surround view video by processing a plurality of videos (3200).

The service device 200 can receive input by a user for moving the viewpoint of the first surround view video (3310).

The service device 200 can create a second surround view video having a viewpoint moved from the first surround view video based on a plurality of videos and input by a user (3320).

For example, the first surround view video and the second surround view video may be videos in which the outside of a vehicle and a virtual model of the vehicle are both displayed through processing of a plurality of videos.

For example, a plurality of videos, a first surround view video, and/or a second surround view video may be any one of real-time videos or recorded videos.

For example, the first surround view video and/or the second surround view video may be provided as a Virtual Reality (VR) video.

The service device 200 can provide a first surround view video and/or a second surround view video (3330).

For example, the service device 200 can transmit any one or more of the first surround view video and/or the second surround view video in a real-time streaming manner.

For example, the service device 200 can receive any one or more of the driving state and/or the position information of a vehicle.

For example, the service device 200 can receive circuit positioning information from a circuit positioning device (not shown). The circuit positioning device (not shown) can determine the position of a vehicle on a circuit and transmit the position together with circuit positioning information.

For example, the service device 200 can provide a first surround view video or a second surround view video in accordance with any one or more of the driving state and/or the position information of a vehicle.

For example, when any one or more conditions in which the driving state of a vehicle is a stop state or the position of a vehicle is on a circuit that is a racing road are satisfied, the service device 200 can provide a first surround view video or a second surround view video.

The service device 200 can create a circuit map of a circuit on which a vehicle drove and a tracking line along which the vehicle drove on the circuit using a plurality of videos (3410).

The service device 200 can create a first circuit driving map showing a circuit and a driving path of the vehicle using the circuit map and the tracking line (3420).

The service device 200 can provide the first circuit driving map (3430).

The service device 200 can receive position information of the vehicle and circuit data related to the position of the vehicle (3510).

The service device 200 can create a tracking line along which the vehicle drove in the circuit map included in the circuit data using the position information of the vehicle and the circuit data (3520).

For example, the processor 210 can create driving points continuously existing on a circuit using the position information of a vehicle and can create a tracking line by connecting the driving points in a line and mapping the driving points in a circuit map.

For example, the processor 210 can create driving points of a vehicle continuously existing on a circuit by comparing the position information of the vehicle and circuit positioning information and can create a tracking line by connecting the driving points in a line and mapping the driving points in a circuit map.

The service device 200 can create a second circuit driving map showing a circuit and a driving path of the vehicle using the circuit map and the tracking line (3530).

The service device 200 can provide the second circuit driving map (3540).

The service device 200 can receive an optimal driving line in the circuit map (3610).

The service device 200 can create a third circuit driving map showing a tracking line and an optimal driving line in a circuit map (3620).

The service device 200 can provide the third circuit driving map (3630).

The service device 200 can receive, from a user, a vehicle position sharing confirmation message for sharing the position of a vehicle with other users.

The service device 200 can register the vehicle of the user as a shared vehicle in response to the vehicle position sharing confirmation message.

The service device 200 can transmit the position information of the vehicle registered as a shared vehicle.

The service device 200 can receive position information of another vehicle positioned on the same circuit as the vehicle of the user, and circuit data related to the position of the vehicle (3710).

The service device 200 can create a fourth circuit driving map showing the position of the another vehicle in the circuit map included in the circuit data using the position information of the another vehicle and the circuit data (3720).

The service device 200 can provide the fourth circuit driving map (3730).

Figure 4:
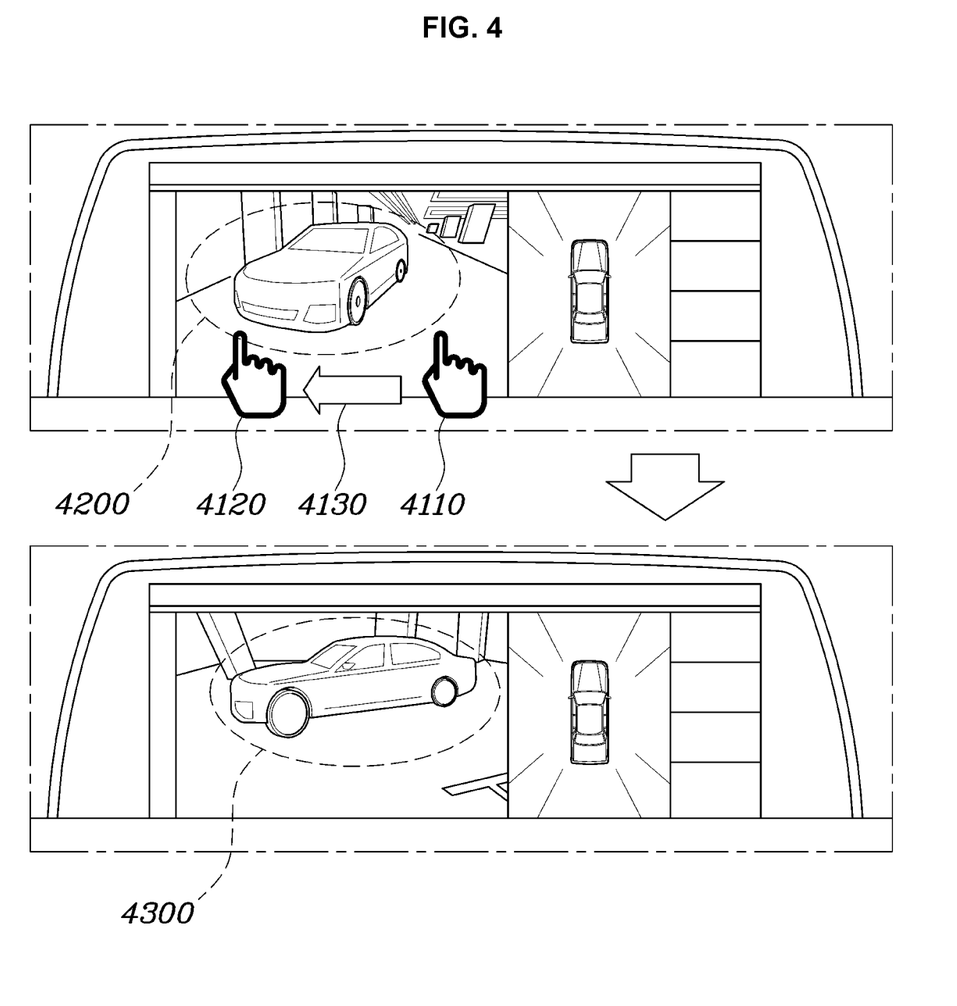
FIGS. 4 and 5 are views illustrating an example of moving a viewpoint of a surround view video by the operation of the service device in response to input from a user.
Figure 5:
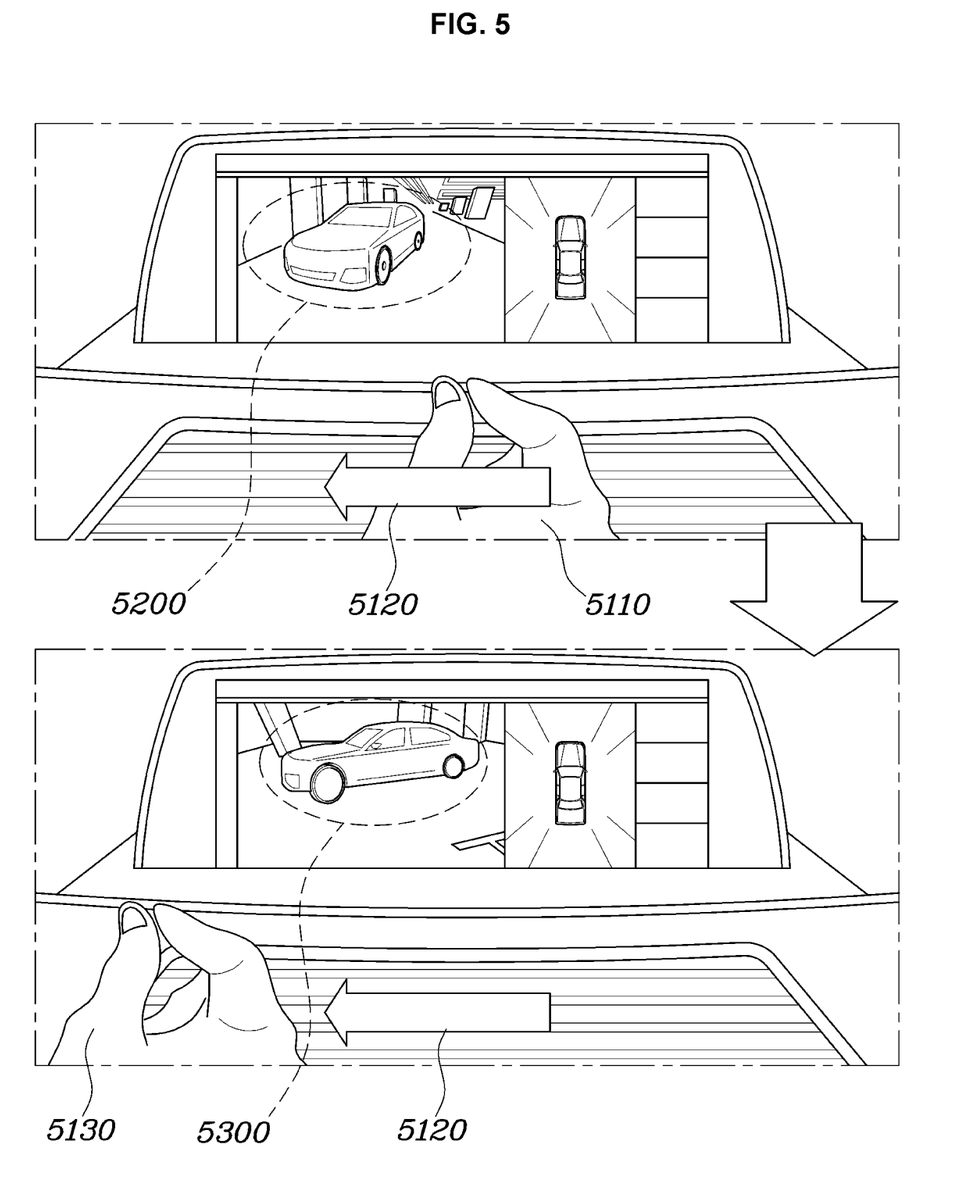

FIGS. 4 and 5 are views illustrating an example of moving a viewpoint of a surround view video by the operation of the service device in response to input from a user.

The display device 300 can sense input by a user for moving the viewpoint of any one or more of a surround view video and/or a plurality of videos.

Referring to FIG. 4, the display device 300 can sense input by a user for moving a viewpoint in a drag direction 4130 accompanying touch input 4110 and 4120 by the user.

The service device 200 can provide a surround view video 4300 having a viewpoint moved after input by a user from a surround view video 4200 before input by the user based on a plurality of videos and the touch input 4110 and 4120 by the user.

Referring to FIG. 5, the display device 300 can remotely sense a finger gesture and/or finger movements 5110, 5120, and 5130 of a user for moving a viewpoint The service device 200 can provide a surround view video 5300 having a viewpoint moved after input by a user from a surround view video 5200 before input by the user based on a plurality of videos and the finger gesture and/or finger movements 5110, 5120, and 5130 of the user.

Figure 6:
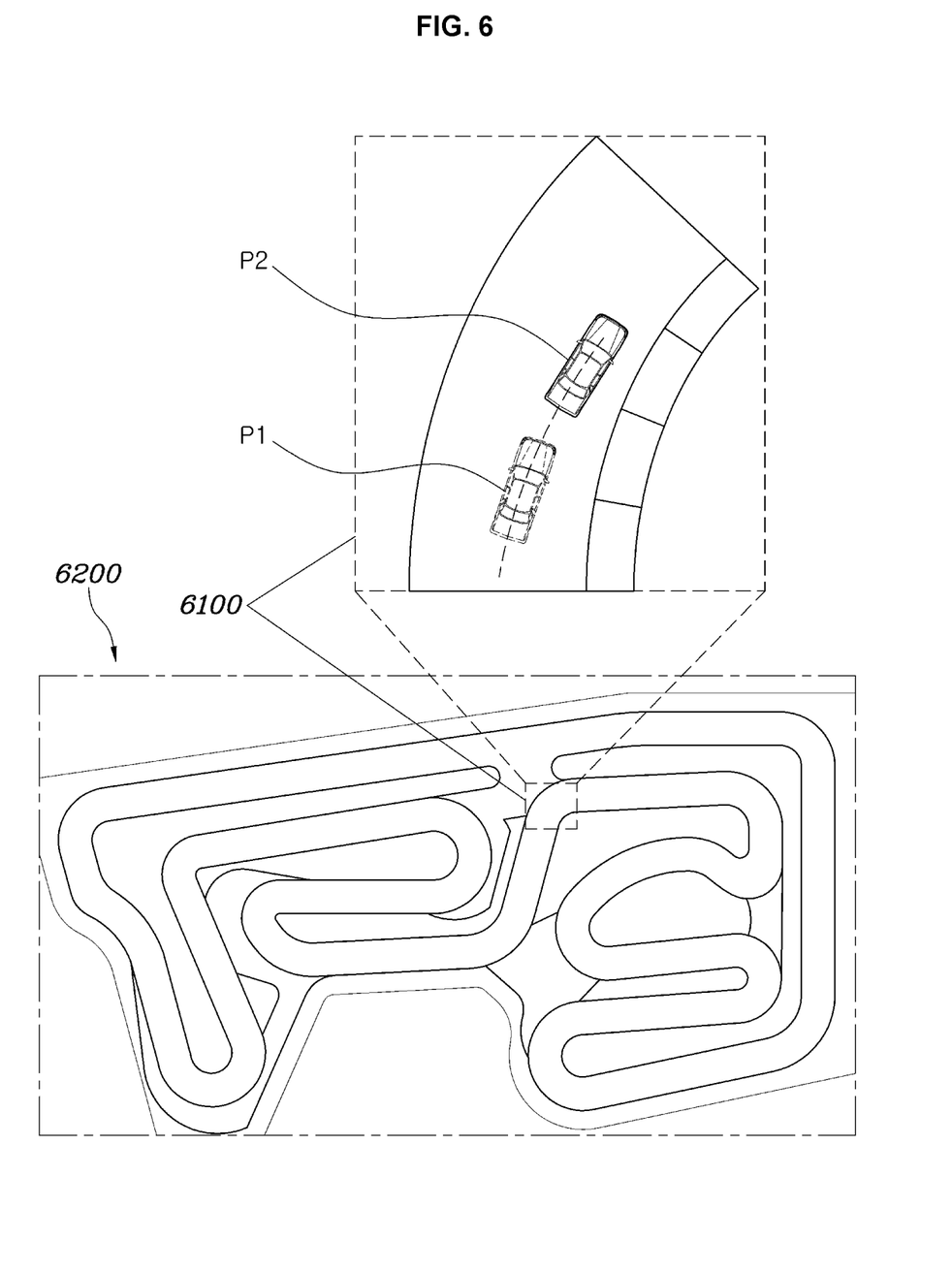
FIGS. 6 to 8 are views illustrating an example of creating a circuit driving map that is provided by the service device.
Figure 7:
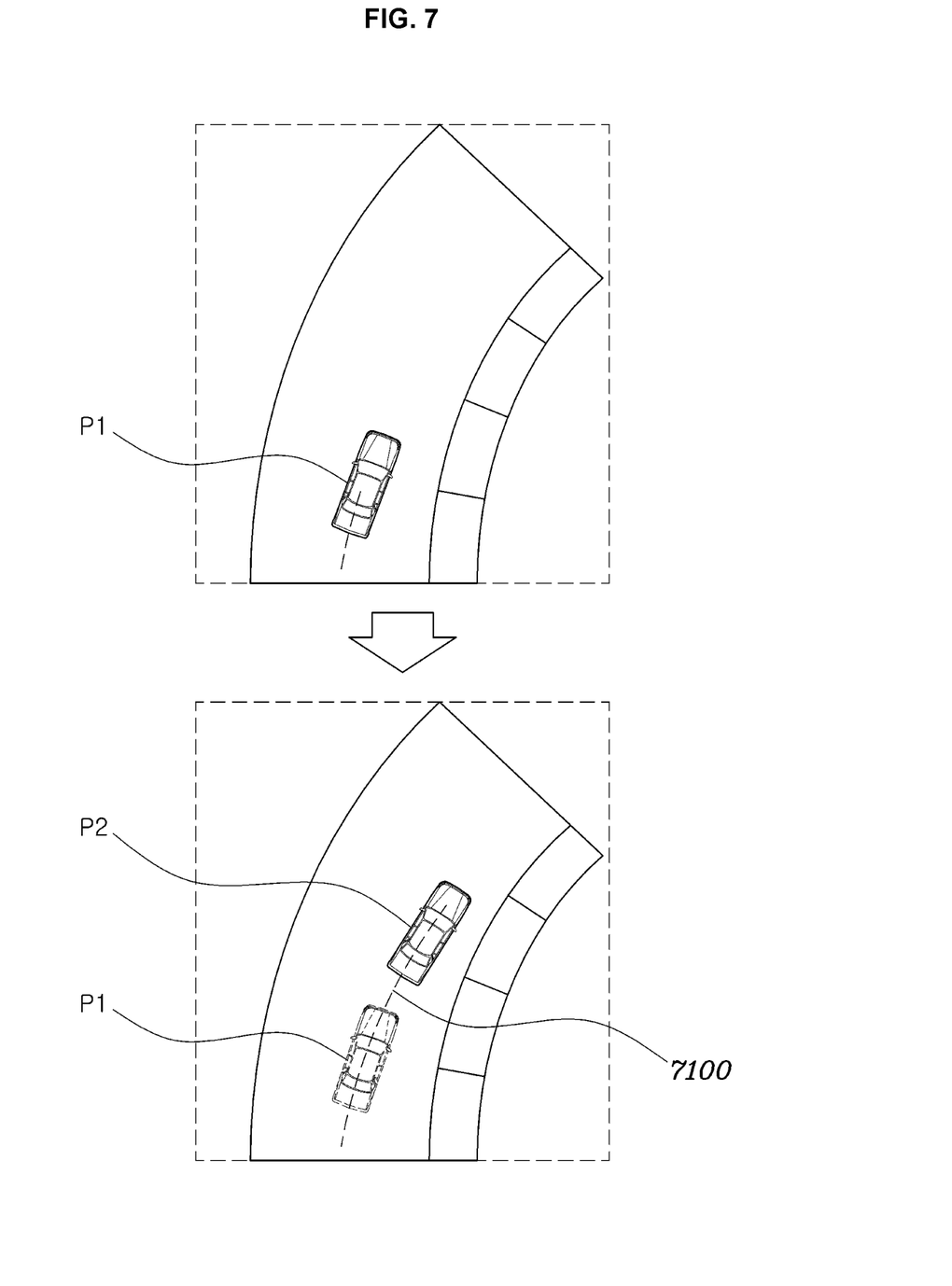
Figure 8:
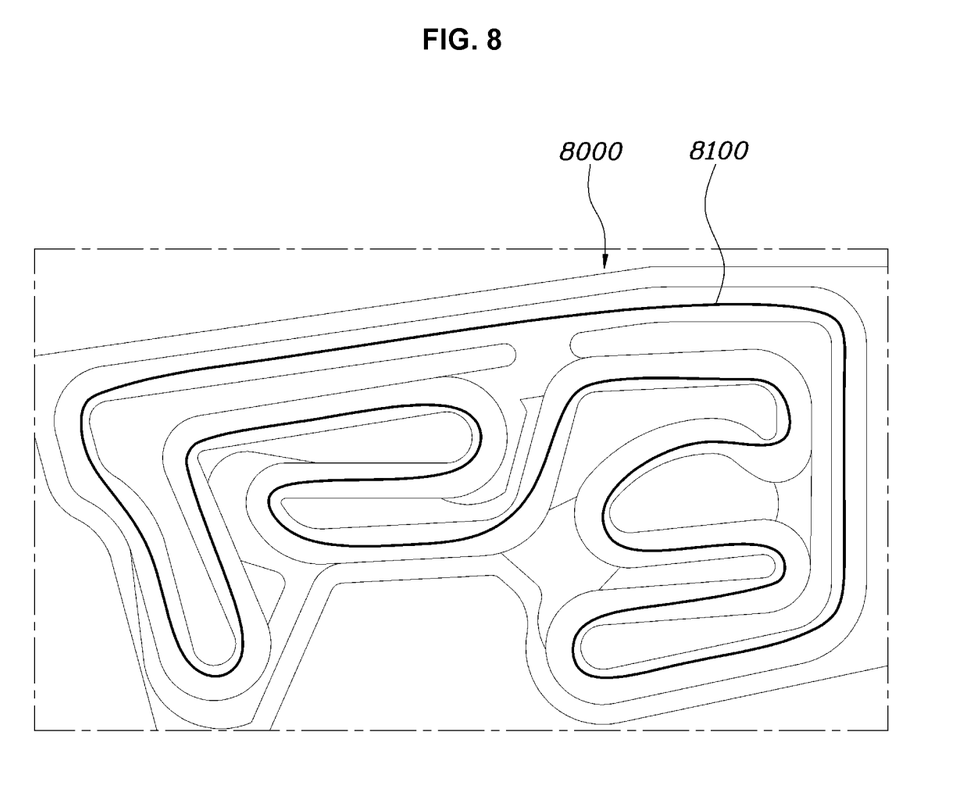

FIGS. 6 to 8 are views illustrating an example of creating a circuit driving map that is provided by the service device.

The service device 200 can create a circuit driving map including any one or more of a path along which a vehicle drove on a circuit, the positions of other vehicles on the circuit, and/or an optimal driving line in a circuit map of the circuit on which the vehicle drove, using any one or more of a plurality of videos, a surround view video, position information of the vehicle, position information of other vehicles, and/or the optimal driving line of the circuit.

The service device 200 can create a circuit map of a circuit on which a vehicle drove and a tracking line along which the vehicle drove on the circuit using a plurality of videos.

Referring to FIG. 6, the service device 200 can create a circuit map by extracting and integrating the width of the road of a circuit, the gradient of the road, the shape of the road, the degree of bending of the road, the relative position of a vehicle on the road, etc. that continuously appear in a plurality of videos.

In detail, the service device 200 can gradually create vehicle-around-circuits 6100 that is taken by a plurality of cameras using a plurality of videos as the vehicle drives, and can create a circuit map 6200 by integrating the vehicle-around-circuits 6100 when the vehicle returns to the start point.

Referring to FIGS. 7 and 8, the service device 200 can determine a first position P1 and a second position P2 of a vehicle using a plurality of videos or the position information of the vehicle and then can map tracking lines 7100 and 8100 into a circuit map using the positions.

For example, the service device 200 can estimate the direction and speed of a vehicle from the relationship between a frame variation value over time and an immediately previous image (e.g., through extraction of a vector value) and can determine the current position of the vehicle.

The service device 200 can provide a circuit map 8000 having a tracking line 8100 mapped, that is, can provide a circuit driving map.

Although embodiments of the present disclosure were described in more detail with reference to the accompanying drawings, the present disclosure is not limited to the embodiments and may be modified in various ways without departing from the scope of the present disclosure. Accordingly, the embodiments described herein are provided merely not to limit, but to explain the spirit of the present disclosure, and the spirit of the present disclosure is not limited by the embodiments. Therefore, the embodiments described above are only examples and should not be construed as being limitative in all respects. The protective range of the present disclosure should be construed by the following claims and the scope and spirit of the present disclosure should be construed as being included in the patent right of the present disclosure.

What is claimed is:

1. A method for processing video obtained by circuit driving, the method comprising:
    receiving, by a processor, a plurality of videos taken by shooting an outside of a vehicle;
    receiving, by the processor, input by a user for moving a viewpoint of a first surround view video;
    creating, by the processor, a second surround view video having the viewpoint moved from the first surround view video based on the plurality of videos and the input by the user; and
    providing, by the processor, the second surround view video,
    wherein the first surround view video and the second surround view video display both the outside of the vehicle and a virtual model of the vehicle through processing of the plurality of videos, and
    wherein the plurality of videos, the first surround view video, and the second surround view video are any one of real-time videos or recorded videos.

2. The method of claim 1, further comprising:
receiving, by the processor, one or more of a driving state of the vehicle or position information of the vehicle; and
providing, by the processor, the first surround view video or the second surround view video in accordance with any one or more of the driving state of the vehicle or the position information of the vehicle.

3. The method of claim 2, wherein the providing of the first surround view video or the second surround view video includes providing the first surround view video or the second surround view video when any one or more conditions in which the driving state of the vehicle is a stop state or the position of the vehicle is on a circuit that is a racing road are satisfied.

4. The method of claim 3, further comprising:
creating, by the processor, a circuit map of the circuit on which the vehicle drove and a tracking line along which the vehicle drove on the circuit using the plurality of videos;
creating, by the processor, a first circuit driving map showing the circuit and a driving path of the vehicle using the circuit map and the tracking line; and
providing, by the processor, the first circuit driving map.

5. The method of claim 3, further comprising:
receiving, by the processor, position information of the vehicle and circuit data related to the position of the vehicle;
creating, by the processor, a tracking line along which the vehicle drove in a circuit map included in the circuit data using the position information of the vehicle and the circuit data;
creating, by the processor, a second circuit driving map showing the circuit and a driving path of the vehicle using the circuit map and the tracking line; and
providing, by the processor, the second circuit driving map.

6. The method of claim 5, further comprising:
receiving, by the processor, an optimal driving line in the circuit map;
creating, by the processor, a third circuit driving map showing the tracking line and the optimal driving line in the circuit map; and
providing, by the processor, the third circuit driving map.

7. The method of claim 3, further comprising:
receiving, by the processor, position information of another vehicle, which is positioned on the same circuit as the vehicle, and circuit data related to the position of the vehicle;
creating, by the processor, a fourth circuit driving map showing the position of the another vehicle in a circuit map included in the circuit data using the position information of the another vehicle and the circuit data; and
providing, by the processor, the fourth circuit driving map.

8. The method of claim 1, further comprising transmitting, by the processor, any one or more of the first surround view video or the second surround view video in a real-time streaming manner.

9. The method of claim 1, wherein the first surround view video and the second surround view video are provided as a Virtual Reality (VR) video.

10. A device for processing video obtained by circuit driving, the device comprising:
a memory configured to store instructions for processing video obtained by the circuit driving; and
a processor configured to execute the instructions,
wherein the instructions are configured to, when executed by the processor, cause the device to:
receive a plurality of videos taken by shooting an outside of a vehicle;
receive input by a user for moving a viewpoint of a first surround view video;
create a second surround view video having the viewpoint moved from the first surround view video based on the plurality of videos and the input by the user; and
provide the second surround view video,
wherein the first surround view video and the second surround view video display both the outside of the vehicle and a virtual model of the vehicle through processing of the plurality of videos, and
wherein the plurality of videos, the first surround view video, and the second surround view video are any one of real-time videos or recorded videos.

11. The device of claim 10, wherein the processor is configured to:
receive one or more of a driving state of the vehicle or position information of the vehicle, and
provide the first surround view video or the second surround view video in accordance with any one or more of the driving state of the vehicle or the position information of the vehicle.

12. The device of claim 11, wherein the processor is configured to provide the first surround view video or the second surround view video when any one or more conditions in which a driving state of the vehicle is a stop state or the position of the vehicle is on a circuit that is a racing road are satisfied.

13. The device of claim 12, wherein the processor is configured to:
create a circuit map of the circuit on which the vehicle drove and a tracking line along which the vehicle drove on the circuit using the plurality of videos,
create a first circuit driving map showing the circuit and a driving path of the vehicle using the circuit map and the tracking line, and
provide the first circuit driving map.

14. The device of claim 12, wherein the processor is configured to:
receive position information of the vehicle and circuit data related to the position of the vehicle,
create a tracking line along which the vehicle drove in a circuit map included in the circuit data using the position information of the vehicle and the circuit data,
create a second circuit driving map showing the circuit and a driving path of the vehicle using the circuit map and the tracking line, and
provide the second circuit driving map.

15. The device of claim 14, wherein the processor is configured to:
receive an optimal driving line in the circuit map;
create a fourth circuit driving map showing the tracking line and the optimal driving line in the circuit map, and
provide the fourth circuit driving map.

16. The device of claim 12, wherein the processor is configured to:
receive position information of another vehicle, which is positioned on the same circuit as the vehicle, and circuit data related to the position of the vehicle;

create a third circuit driving map showing the position of the another vehicle in a circuit map included in the circuit data using the position information of the another vehicle and the circuit data, and provide the third circuit driving map.

17. The device of claim 10, wherein the processor is configured to transmit any one or more of the first surround view video or the second surround view video in a real-time streaming manner.

18. The device of claim 10, wherein the first surround view video and the second surround view video are provided as a Virtual Reality (VR) video.

* * * * *